(12) United States Patent
Tamimi et al.

(10) Patent No.: US 12,355,256 B2
(45) Date of Patent: Jul. 8, 2025

(54) CONTROLLABLE GRID INTERFACE FOR MICROGRIDS

(71) Applicants: Behnam Tamimi, Waterloo (CA); Claudio Cañizares, Milton (CA)

(72) Inventors: Behnam Tamimi, Waterloo (CA); Claudio Cañizares, Milton (CA)

( * ) Notice: Subject to any disclaimer, the term of this patent is extended or adjusted under 35 U.S.C. 154(b) by 207 days.

(21) Appl. No.: 18/547,427

(22) PCT Filed: Feb. 25, 2022

(86) PCT No.: PCT/IB2022/051698
§ 371 (c)(1),
(2) Date: Aug. 22, 2023

(87) PCT Pub. No.: WO2022/180603
PCT Pub. Date: Sep. 1, 2022

(65) Prior Publication Data
US 2024/0136823 A1    Apr. 25, 2024

Related U.S. Application Data

(60) Provisional application No. 63/207,363, filed on Feb. 25, 2021.

(51) Int. Cl.
*H02M 7/757* (2006.01)
*H02J 3/36* (2006.01)
(Continued)

(52) U.S. Cl.
CPC .............. *H02J 3/381* (2013.01); *H02J 3/36* (2013.01); *H02J 3/46* (2013.01); *H02M 7/7575* (2013.01); *H02J 2300/20* (2020.01)

(58) Field of Classification Search
CPC ...... H02M 7/7575; H02M 7/758; H02M 7/77; H02M 7/79; H02M 7/68; H02M 7/757;
(Continued)

(56) References Cited

U.S. PATENT DOCUMENTS 6,115,269 A * 9/2000 Gunnarsson .............. H02J 3/36
363/51
6,963,187 B2 11/2005 Bebic et al.
(Continued)

OTHER PUBLICATIONS

Alvarez et al., "Operation of a utility connected microgrid using an IEC 61850-based multi-level management system," IEEE Trans. Smart Grid, vol. 3, No. 2, pp. 858-865, Jun. 2012.
(Continued)

*Primary Examiner* — Nguyen Tran
(74) *Attorney, Agent, or Firm* — Shin Hung; VanTek IP LLP

(57) ABSTRACT

A microgrid connector controller (MGC) for transferring power between a power grid and a microgrid via an AC link. The MCG includes a pair of bidirectional AC/DC converters coupled to a common DC link and each having an AC line. One converter closer to the microgrid is configured to regulate frequency of AC voltage of its AC line to a predetermined frequency. The AC link includes the AC lines coupled in series with a terminal the microgrid, and a current divider coupled to a terminal of the power grid. The current divider is configured to set the first converter's current level lower than the second converter's current level.

12 Claims, 17 Drawing Sheets

(51) Int. Cl.
*H02J 3/38* (2006.01)
*H02J 3/46* (2006.01)

(58) Field of Classification Search
CPC .... H02M 7/54; H02J 3/381; H02J 3/38; H02J 3/40; H02J 3/42; H02J 3/46; H02J 3/36; H02J 3/34
See application file for complete search history.

(56) References Cited

U.S. PATENT DOCUMENTS

| | | | |
|---|---|---|---|
| 2019/0044335 A1 | 2/2019 | Soverns et al. | |
| 2019/0140569 A1* | 5/2019 | Schnetzka | H02M 1/126 |
| 2019/0386581 A1* | 12/2019 | Soverns | H02J 1/12 |

OTHER PUBLICATIONS

Farrokhabadi et al., "Microgrid stability definitions, analysis, and examples," IEEE Trans. Power Syst., vol. 35, No. 1, pp. 13-29, Jan. 2020.
"Flexible ac transmission systems benefits study," San Diego Gas and Electric, San Deigo, CA., USA, Oct. 1999.
IEEE PES Industry Technical Support Task Force, "Impact of Inverter based Generation on Bulk Power System Dynamics and Short-Circuit Performance," Tech. Rep. PES-TR68, 2018.
"IEEE Standard for Interconnection and Interoperability of Distributed Energy Resources with Associated Electric Power Systems Interfaces," IEEE Std. 1547, 2018.
"IEEE Standard for the Specification of Microgrid Controllers," IEEE Std. 2030.7, 2017.
IEEE PES Industry Technical Support Task Force, "Managing the New Grid," Tech. Rep. PES-TR70, 2018.
Lasseter et al., "White Paper on Integration of Distributed Energy Resources: The CERTS Microgrid Concept," LBNL-50829 Office of Power Technologies, the US Department of Energy, Berkeley, CA, 2002, Tech. Rep. DE-AC03-76SFW098.
Li et al., "Coordinated control method of voltage and reactive power for active distribution networks based on soft open point," IEEE Trans. Sustain. Energy, vol. 8, No. 4, pp. 1430-1442, Oct. 2017.
Nguyen et al., "Smart power router: A flexible agent-based converter interface in active distribution networks," IEEE Trans. Smart Grid, vol. 2, No. 3, pp. 487-495, Sep. 2011.
Olivares et al., "Trends in microgrid control ," IEEE Trans. Smart Grid, vol. 5, No. 4, pp. 1905-1919, Jul. 2014.
Piwko et al., "Variable frequency transformer—A new alternative for asynchronous power transfer," in IEEE-PES Conf. in Africa, Durban, SA, 2005, pp. 1-6.
Raza et al., "Intra- and inter-phase power management and control of a residential microgrid at distribution level," IEEE Trans. Smart Grid, vol. 10, No. 6, pp. 6839-6848, Nov. 2019.
Rostami et al., "How DERs could change grid topology and affect system performance," IEEE Smart Grid Newsletter, pp. 1-5, Jun. 2020.
Strunz, "Developing benchmark models for studying the integration of distributed energy resources," in Proc. IEEE PES General Meeting, Montreal, Quebec, Canada, pp. 1-2, 2006.
Tamimi et al., "Modeling and application of Hybrid Power Flow Controller in distribution systems," IEEE Trans. Power Del., vol. 33, No. 6, pp. 2673-2682, Aug. 2018.
Tamimi et al., "Hybrid Power Flow Controller steady-state modeling, control, and practical application," IEEE Trans. Power Syst., vol. 32, No. 2, pp. 1483-1492, Mar. 2017.
Tamimi, Behnam et al., "An Effective Controllable Grid Interface for Microgrids", IEEE Transactions on Smart Grid, Submitted Jan. 2022.
Tamimi, Behnam et al., "An Effective Controllable Grid Interface for Microgrids", IEEE Transactions on Smart Grid, Submitted Aug. 2020.
"Technical Requirements for the Connection of Generating Stations to the Hydro-Quebec Transmission System," Hydro-Quebec TransEnergie, 2009. [Online]. Available: http://www.hydroquebec.com.
Zhang, et al., Flexible AC Transmission Systems: Modelling and Control. London, UK: Springer Verlog, 2012.

* cited by examiner

TABLE I
DER PARAMETERS

| Parameter | $SM_1$ | $SM_2$ |
|---|---|---|
| $S$ | 4 MVA | 1 MVA |
| $V$ | 12.47 kV | 12.47 kV |
| $f$ | 60 Hz | 60 Hz |
| $R_s$ | 0.02 pu | 0.02 pu |
| $X_s$ | 0.005 pu | 0.005 pu |
| Inertia | 2 s | 2 s |
| Gov. Droop | 5% | 2% |
| Gov. Time const. | 0.2 s | 0.2 s |

FIG. 14

TABLE II
MICROGRID LOAD

| Node | $P$ [kW] | $Q$ [kvar] |
|---|---|---|
| 15 | 10 | 10 |
| 16 | 300 | 300 |
| 17-L1 | 1085.4 | 685.9 |
| 17-L2 | 0–60 | 0–30 |
| 18 | 90 | 30 |

FIG. 15

TABLE III
B2B CONVERTER/CONTROLLERS PARAMETERS

| Parameter | Conv. 1 | Conv. 2 |
|---|---|---|
| $R$ | 0.1 Ω | 0.1 Ω |
| $L$ | 40 mH | 100 mH |
| $C$ | 10 uF | 10 uF |
| PLL ($K_p, K_i$) | (50, 900) | (50, 900) |
| Active power controller ($K_{p1}, K_{i1}$) | (5, 100) | (5, 100) |
| Reactive power controller ($K_{p2}, K_{i2}$) | (5, 100) | (5, 100) |
| DC voltage controller ($K_{p3}, K_{i3}$) | (10, 50) | - |

FIG. 16

TABLE IV
MGC CONVERTER/CONTROLLERS PARAMETERS

| Parameter | Conv. 1 | Conv. 2 |
|---|---|---|
| $R$ | 0.1 Ω | 0.1 Ω |
| $L$ | 40 mH | 60 mH |
| $C$ | 10 uF | 10 uF |
| PLL ($K_p, K_i$) | (50, 900) | (50, 900) |
| Active power controller ($K_{p1}, K_{i1}$) | (5, 100) | (5, 100) |
| Reactive power controller ($K_{p2}, K_{i2}$) | (5, 100) | (5, 100) |
| DC voltage controller ($K_{p3}, K_{i3}$) | (10, 50) | - |
| Frequency controller ($K_{p4}, K_{i4}$) | - | (5, 5) |

FIG. 17

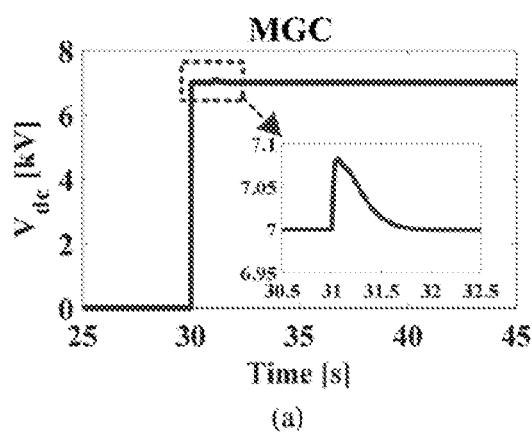
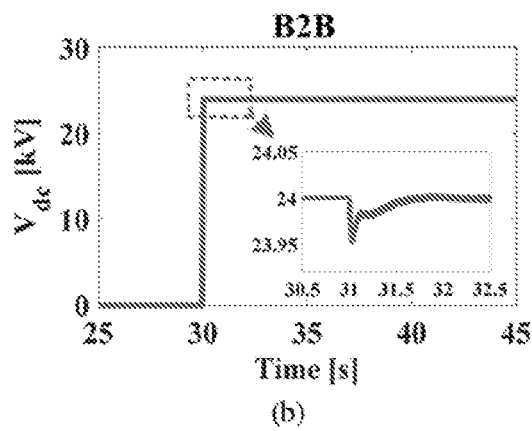
FIG. 18
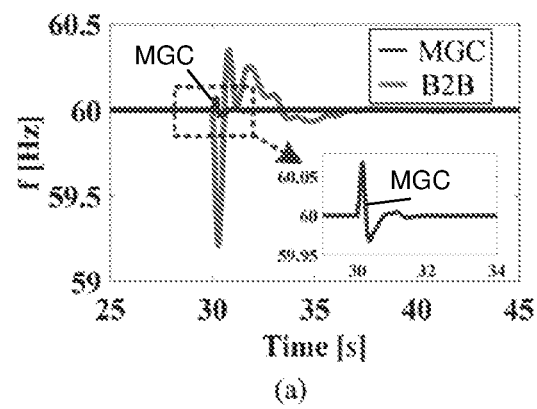
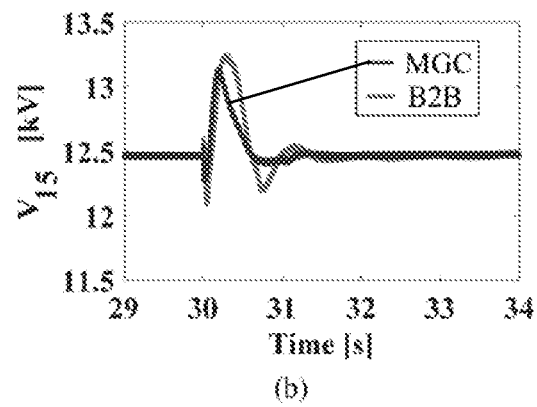
FIG. 19

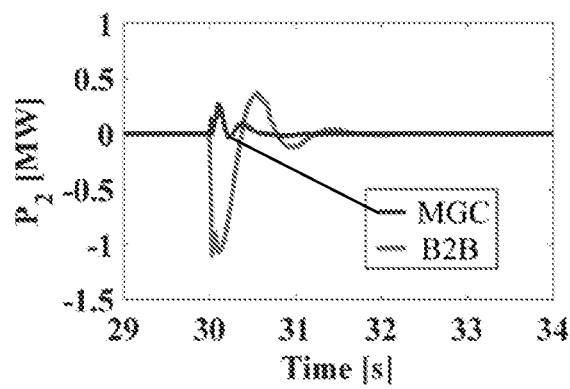
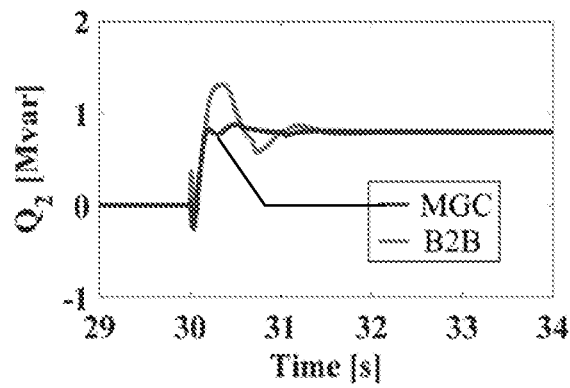
FIG. 20
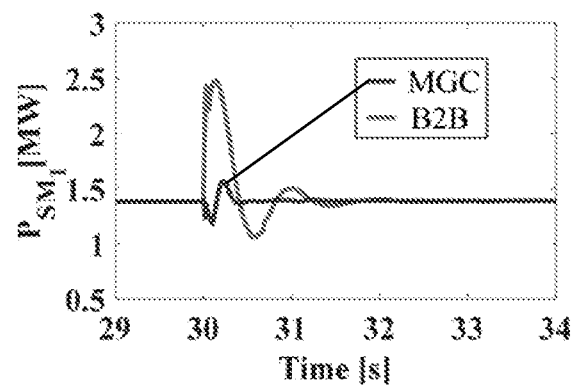
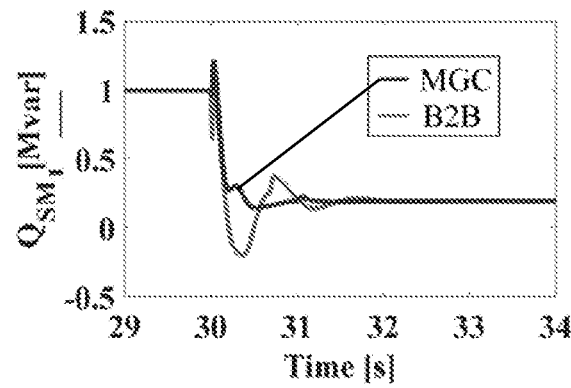
FIG. 21

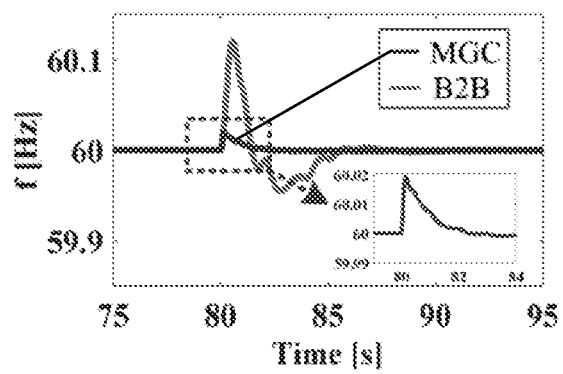
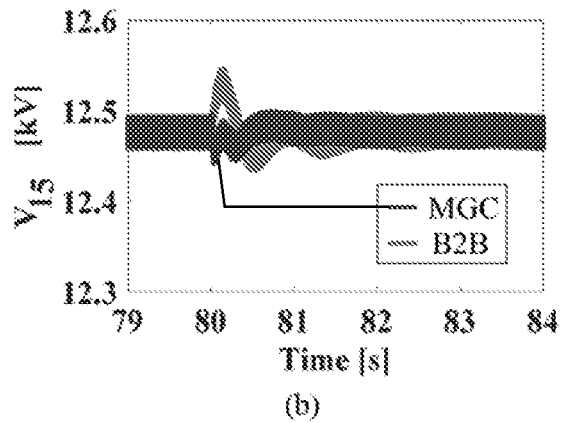
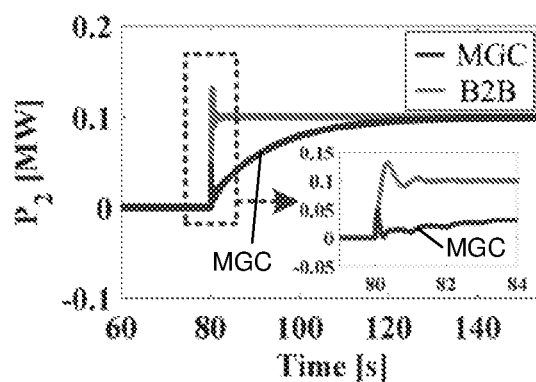
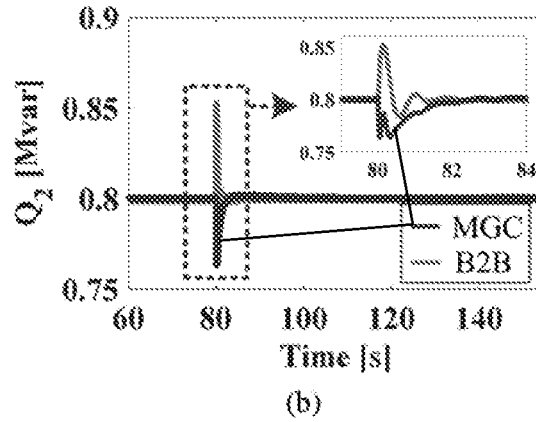
FIG. 22
FIG. 23

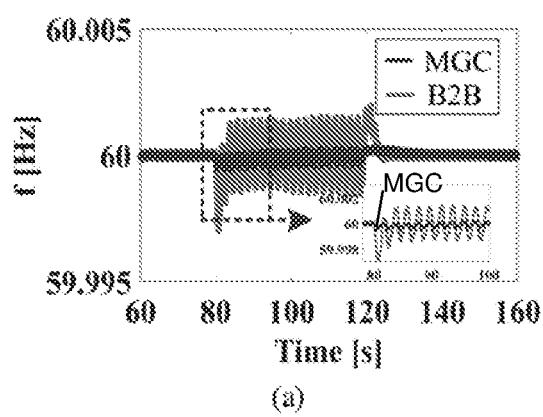
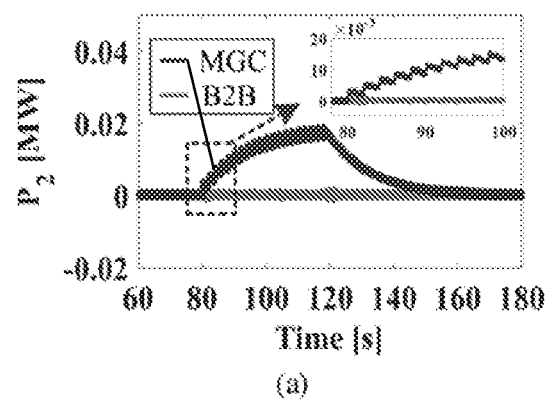
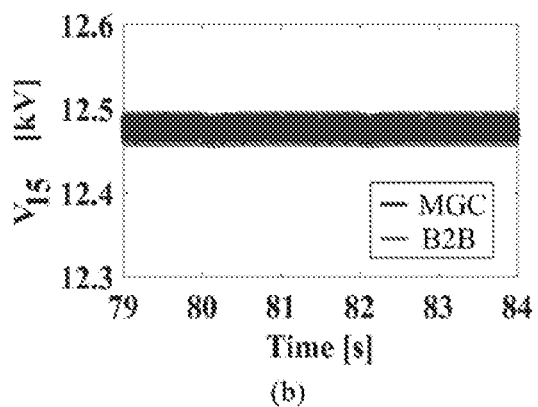
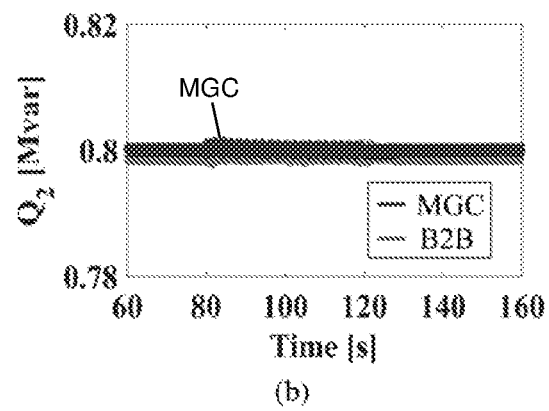
FIG. 24
FIG. 25

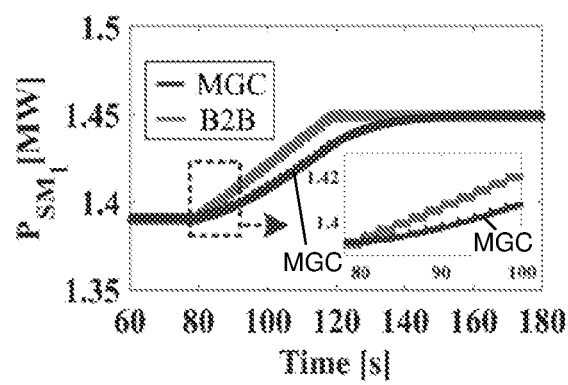
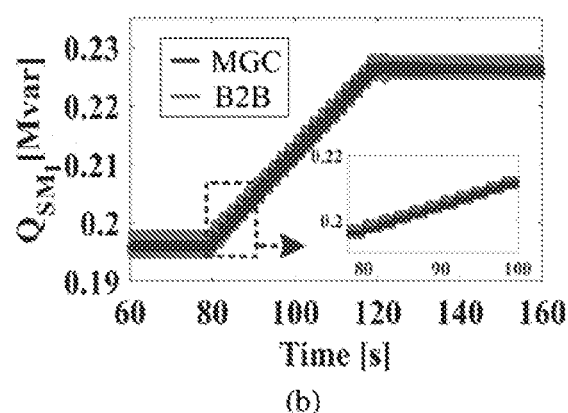
FIG. 26
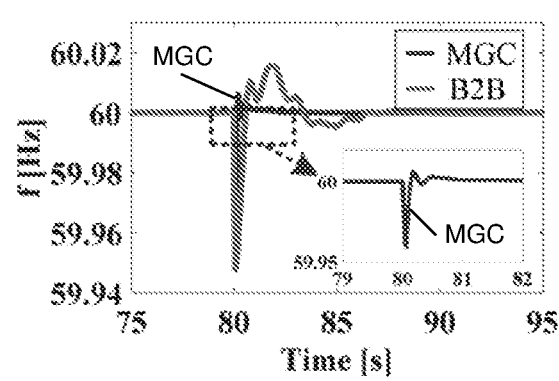
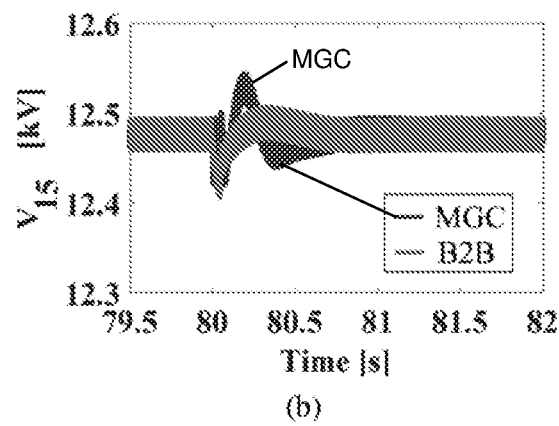
FIG. 27

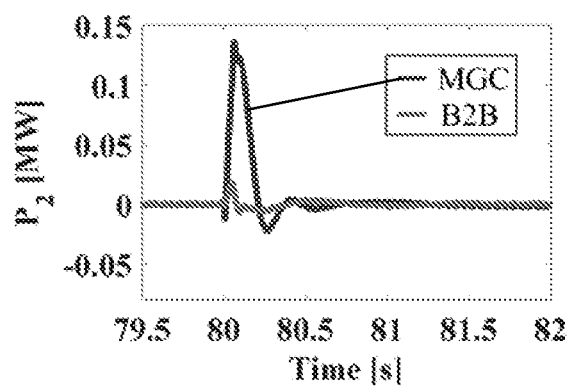
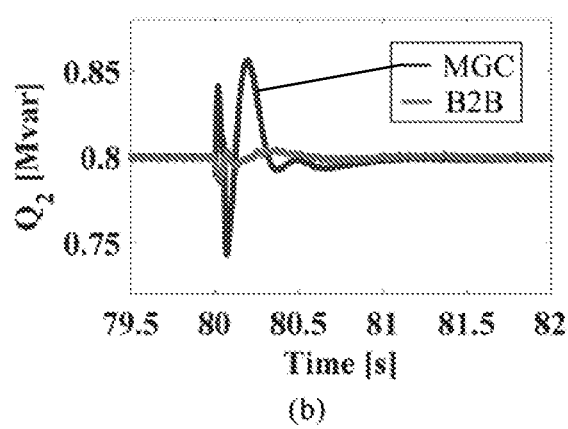
FIG. 28
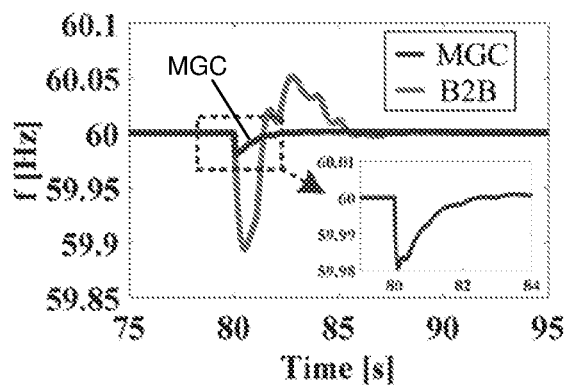
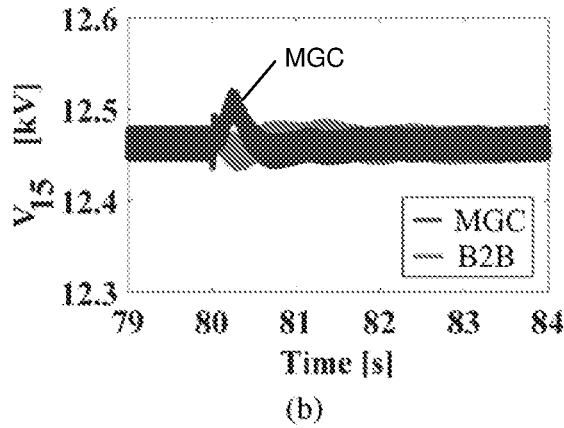
FIG. 29

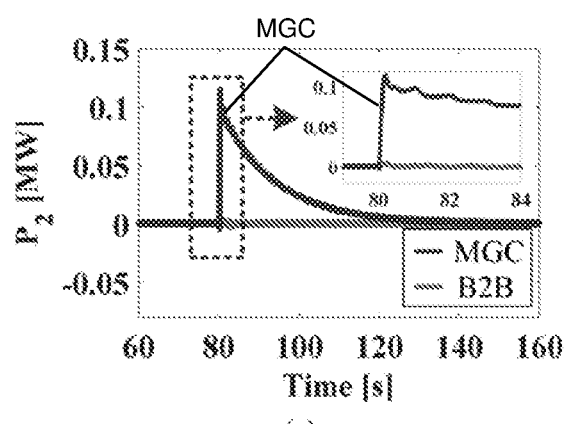
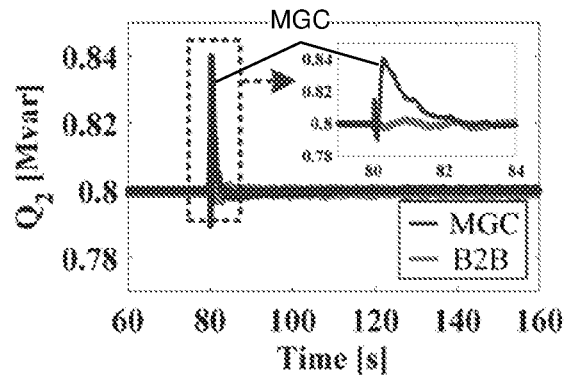
FIG. 30
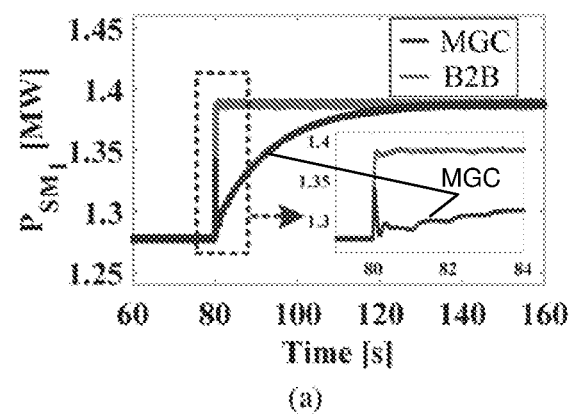
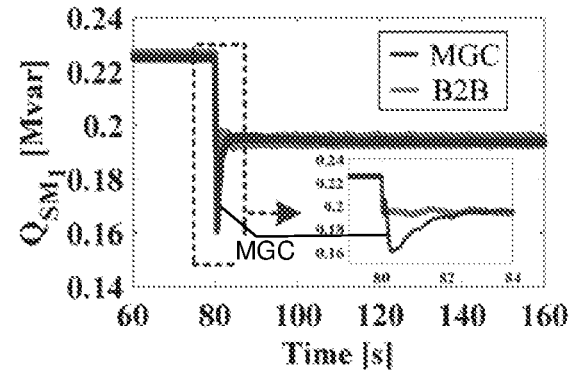
FIG. 31

CONTROLLABLE GRID INTERFACE FOR MICROGRIDS

CROSS REFERENCE TO RELATED APPLICATIONS

This application claims the benefit of priority of U.S. Provisional Patent Application No. 63/207,363 filed on Feb. 25, 2021, which is hereby incorporated by reference.

FIELD

The present disclosure relates generally to power grids. More particularly, the present disclosure relates to a controlled interface between two different power grids.

BACKGROUND

Power grids are used to deliver and distribute generated power for industrial, commercial and domestic purposes, typically in denser urban regions. Hence some power grids can cover areas of hundreds to thousands of square kilometres. However this can be disadvantageous as a failure to a critical piece of infrastructure in a small region can cause a power outage blackout or brownouts for everyone coupled to the grid. Even when there is no failure event, significant grid management is required to balance generation and demand over the entire area of coverage. As urban sprawl continues, high investment costs in transmission lines and transformers is required to expand the range of the grid to cover newly developing areas.

Microgrids on the other hand are local clusters of loads and generators for reliable and economic integration of distributed energy resources (DERs), energy storage systems (ESS) and controllable loads. By example, DERs can take the form of fossil fuel powered generators, solar and wind generating sources, and energy storage devices such as batteries. Microgrids disconnected from the main grid are also referred to as isolated or stand-alone microgrids, which are typically found in remote communities or mining sites, where a main power grid connection is not feasible because of technical or economical constraints. Microgrids are also expected to operate connected to a host grid, such as a main power grid run by a utility by example; therefore flexible, economic and reliable connection of microgrids to the main grid or even other microgrids is of significant relevance.

To provide this interconnection between two grids, such as between a main utility grid and a microgrid, an interface is needed to control power transfer between them. This can be achieved by different means, for example with phase shifting transformers, variable frequency transformers (VFT), or back-to-back (B2B) links. B2B interfaces are the current standard and most commonly used for grid-microgrid interfacing as it is able to asynchronously connect two power networks and control the power flowing between them. B2B interfaces are well known in the art and well-documented in the literature.

FIG. 1 is a schematic showing a common B2B interface architecture for interconnecting a grid and a microgrid. FIG. 1 includes a grid 10, a microgrid 12 and a B2B interface 14. Grid 10 has 3 phase wiring coupled to terminal 16 (T1) while microgrid 12 has 3 phase wiring coupled to terminal 18 (T2). The B2B interface 14 includes a first converter unit 20, a second converter unit 22, and a DC link 24. Both converter units 20 and 22 have 3-phase transformers of predetermined winding ratios, each having secondary windings coupled to terminals T1 and T2 respectively. Terminals T1 and T2 are physical interfaces which can be controlled to enable selective connection and disconnection of the 3 phase wiring between the grid and the respective converter units 20 and 22 via electromechanical switches. The 3 slashes appearing on the interconnecting lines indicates that there are 3 physical wires carrying the AC voltage and current. Each converter unit 20 and 22 generally includes an AC/DC converter which includes transformer, filters, and a commutation reactor, and a DC capacitor linking the DC sides of the converter units 20 and 22. In each of converter units 20 and 22 is an AC block for converting the received AC voltage into a DC voltage which is provided on the DC link 24 by the DC block. The converter units 20 and 22 are bidirectional, therefore the voltage of the DC link 24 can be converted to AC for supplying microgrid 12.

Current B2B implementations are large in size and require costly components due to the high voltage levels they use. For example, the voltage across DC link 24 in the North American power system can be about 24 kV, while the voltage on the secondary side of its transformers can be as high as 12.48 kV. Components rated for such voltage levels are relatively expensive, so the direct costs for a typical B2B interface are high. However, indirect costs such as delivery, installation and construction costs for structures housing the equipment can be double the direct costs of the components.

It is, therefore, desirable to provide a grid interface controller that operates with lower voltages, thus reducing its size, and therefore overall costs.

SUMMARY

It is an object of the present disclosure to obviate or mitigate at least one disadvantage of previous power grid interfaces.

In a first aspect, the present disclosure provides a microgrid connector controller for coupling a first terminal of a first AC power grid to a second terminal of a second AC power grid. The microgrid connector controller includes a first bidirectional AC/DC converter, a second bidirectional AC/DC converter and an AC link. The first bidirectional AC/DC converter is coupled to a DC link and has a first AC line. The second bidirectional AC/DC converter is coupled to the DC link, has a second AC line coupled in series with the first AC line, and is configured to regulate frequency of AC voltage of the second AC line to a predetermined frequency. The AC link is configured to transfer active power from the first power grid to the second power grid. The AC link includes the first and second AC lines coupled in series with the second terminal, and a current divider coupled to the first terminal, the first AC line and the second AC line, for setting a current of the second bidirectional AC/DC converter to be larger than a current of the first bidirectional AC/DC converter.

In an embodiment of the first aspect, the current divider includes a first impedance coupled in series between the first AC line and the first terminal, and a second impedance coupled in parallel with first impedance and the first AC line. In this embodiment the resistance of the first impedance is greater than the second impedance.

In a further embodiment of the first aspect, the first bidirectional AC/DC converter is configured to drive a DC voltage on the DC link in response to the first AC voltage level of the first AC line.

In yet another embodiment, the first bidirectional AC/DC converter includes a first 3-phase transformer with a secondary winding being the first AC line, and the second bidirectional AC/DC converter includes a second 3-phase transformer with a secondary winding being the second AC line. In this embodiment, the first bidirectional AC/DC converter includes a voltage source converter (VSC) coupled to a primary winding of the first 3-phase transformer and coupled to the DC link, the VSC being configured to be responsive to a reactive power reference and an active power reference. Here the first bidirectional AC/DC converter can include an AC voltage regulator and a DC voltage regulator. The AC voltage regulator is configured to generate the reactive power reference in response to measured voltage and power at the first terminal compared to a first predetermined reference. The DC voltage regulator is configured to generate the active power reference in response to measured DC link voltage compared to a second predetermined reference, where the reactive power reference and the active voltage reference are used by the VSC to drive and regulate the DC link voltage.

Alternate to the above embodiment, the second bidirectional AC/DC converter includes a voltage source converter (VSC) coupled to a primary winding of second first 3-phase transformer and coupled to the DC link, the VSC configured to be responsive to a reactive power reference and an active power reference. Here the second bidirectional AC/DC converter includes an AC voltage regulator and a frequency regulator. The AC voltage regulator is configured to generate the reactive power reference in response to measured voltage and power at the second terminal compared to a first predetermined reference. The frequency regulator is configured to generate the active power reference in response to measured frequency at the second terminal compared to a second predetermined reference, the reactive power reference and the active power reference being used by the VSC to regulate frequency of the AC voltage of the second AC line.

In this alternate embodiment, the frequency regulator includes a frequency measurement circuit, a comparator circuit, a first proportional integral (PI) controller and a second PI controller. The frequency measurement circuit is configured to generate the measured frequency at the second terminal. The comparator circuit is configured to generate a differential signal between the measured frequency and the second predetermined reference. The first proportional PI controller is configured to generate the active power reference in response to the differential signal. The second PI controller is configured to generate a local power reference for local frequency regulators of generators connected to the second AC power grid.

In this alternate embodiment, the VSC includes a setpoint calculator and a current controller. The setpoint calculator is configured to generate setpoint reference currents in response to at least the reactive power reference and the active power reference. The current controller is configured to generate control voltages for controlling driver transistors of the VSC in response to at least the setpoint reference currents. Here are the setpoint calculator includes a summation block and an inverse transformer block. The summation block is configured to add an auxiliary signal accounting for internal losses to the reactive power reference and the active power reference. The inverse transformer block is configured to execute a mathematical operation accounting for the second 3-phase transformer turn ratio and phase shift, and generates the setpoint reference currents in response to the output of the summation block.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 14 shows a table listing DER parameters for example simulations;

FIG. 15 shows a table listing microgrid load parameters for example simulations;

FIG. 16 shows a table listing B2B converter/controller parameters for example simulations;

FIG. 17 shows MGC 100 converter/controller parameters for example simulations;

FIGS. 18 to 23 are plots for example case 1 showing simulation results comparing performance of the MCG according to the present embodiments to traditional B2B;

FIGS. 24 to 26 are plots for example case 2 showing simulation results comparing performance of the MCG according to the present embodiments to traditional B2B;

FIGS. 27 and 28 are plots for example case 3 showing simulation results comparing performance of the MCG according to the present embodiments to traditional B2B; and, FIGS. 29 to 31 are plots for example case 4 showing simulation results comparing performance of the MCG according to the present embodiments to traditional B2B.

DETAILED DESCRIPTION

Unless defined otherwise, all technical and scientific terms used herein have the same meaning as commonly understood by one of ordinary skill in the art to which this invention belongs. In this description, reference signals and setpoints are used interchangeably, and refers to some predetermined and known value.

As used herein, the term "about" refers to an approximately +/−10% variation from a given value. It is to be understood that such a variation is always included in any given value provided herein, whether or not it is specifically referred to.

The term "plurality" as used herein means more than one, for example, two or more, three or more, four or more, and the like.

The use of the word "a" or "an" when used herein in conjunction with the term "comprising" may mean "one", but it is also consistent with the meaning of "one or more", "at least one", and "one or more than one".

As used herein, the terms "comprising", "having", "including", and "containing", and grammatical variations thereof, are inclusive or open-ended and do not exclude additional, unrecited elements and/or method steps. The term "consisting essentially of" when used herein in connection with an apparatus, system, composition, use or method, denotes that additional elements and/or method steps may be present, but that these additions do not materially affect the manner in which the recited apparatus, system composition, method or use functions. The term "consisting of" when used herein in connection with an apparatus, system, composition, use or method, excludes the presence of additional elements and/or method steps. An apparatus, system composition, use or method described herein as comprising certain elements and/or steps may also, in certain embodiments consist essentially of those elements and/or steps, and in other embodiments consist of those elements and/or steps, whether or not these embodiments are specifically referred to.

Figure 1:
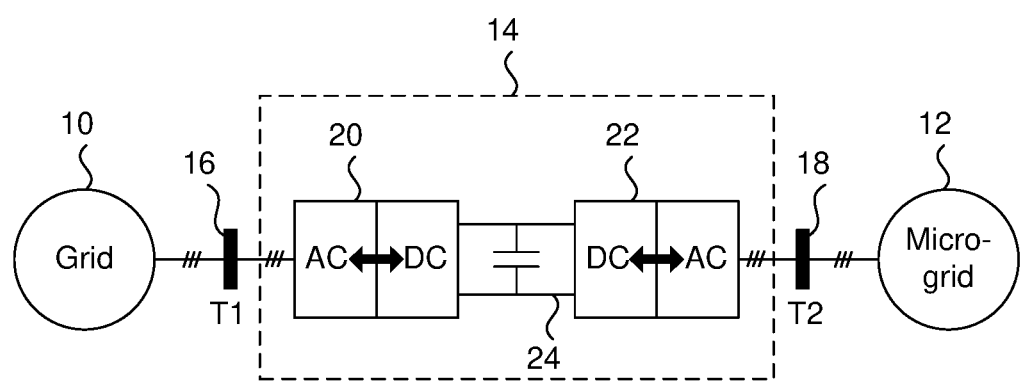
FIG. 1 is a schematic showing the architecture of a B2B microgrid interface controller, according to the prior art.

A microgrid is a cluster of loads and DER operating as a single controllable system that provides power locally to its customers. To the utility that runs a larger power grid, the microgrid may represent a single controllable load/generator that can respond quickly to control signals, coupled to the grid through an appropriate interface, as depicted in FIG. 1. To the customer, the microgrid is an infrastructure that potentially meets their needs, including enhanced reliability, improved power quality, increased efficiency, to name a few. The interconnection of microgrids to the utility/grid should comply with well-established standards such as IEEE 1547, which defines technical requirements for the interconnection. In this context, a proper microgrid interface should provide a bidirectional and readily controllable connection with the rest of the system.

Reliability and cost-effectiveness of the interface should be in line with the requirements of the target system, mainly of the microgrid, ensuring a dependable solution based on customers' needs and economic aspects of the microgrid operation. According to the present embodiments, a microgrid connector controller (MGC) is described which meets these needs and requirements.

Figure 2A:
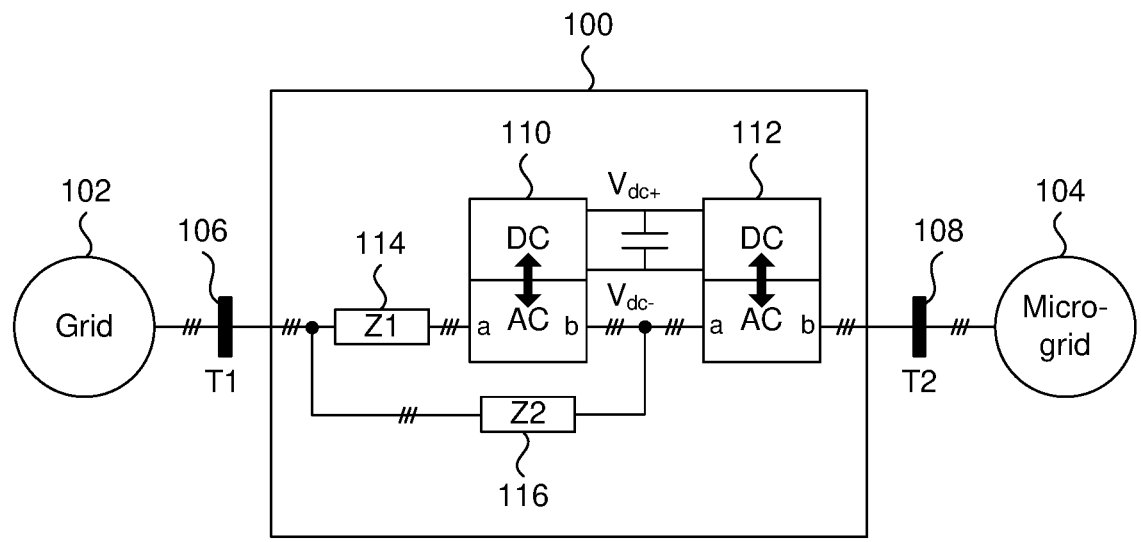
FIG. 2A is a block diagram of a microgrid connector controller (MGC), according to a present embodiment.

FIG. 2A is a block diagram of an MGC according to a present embodiment. In this example configuration, MGC 100 is shown coupled to a grid 102 and a microgrid 104 via terminals 106 (T1) and 108 (T2). Terminals T1 and T2 are the same as terminals T1 and T2 shown in FIG. 1. In an alternate example configuration, MGC 100 can be connected to two microgrids. MGC 100 includes a first bidirectional AC/DC converter 110, a second bidirectional AC/DC converter 112, a first impedance 114 (Z1) and a second impedance 116 (Z2). According to the present embodiments, the first impedance Z1 is higher than second impedance Z2, and both are arranged in a voltage divider configuration. By example only, Z1 can be 50 Ohms and Z2 can be 0.1 Ohms, and other values can be selected depending on the overall system requirements.

Both converters 110 and 112 include bidirectional power terminals "a" and "b" for connection to three-phase lines, which are coupled in series with a transformer. Power terminals a and b of converter 110 are coupled to an AC line while power terminals and B of converter 112 are similarly coupled to its own AC line, where each AC line forms the secondary winding of the transformers. Both converters 110 and 112 are connected to a common DC Link consisting of a positive rail $V_{dc+}$ in a negative rail $V_{dc-}$. In each of converters 110 and 112, the transformer along with converter circuits converts the 3 phase AC voltage into DC for the DC Link and vice versa.

The right side node of terminal T1 is a 3 phase line that is coupled to the left side of impedances 114 and 116 in parallel. The right side of impedance 114 is coupled to power terminal a of converter 110. Power terminal b of converter 110 is coupled to power terminal a of converter 112 and to the right side of impedance 116. Impedance 116 is coupled in parallel with impedance 114 and the AC line of converter 110. Finally, the power terminal b of converter 112 is coupled to terminal T2 via a three-phase line. The above-described interconnections creates a series connection of converters 110 and 112 within MGC 100, which becomes an AC voltage path between terminals T1 and T2. This AC voltage path is referred to as an AC link.

Functionally, MGC 100 provides two paths for power flow between its terminals T1 and T2, namely, AC and DC links. In the presently shown configuration of FIG. 2A, converter 110 is configured to provide DC link voltage regulation while converter 112 is configured to control the power flow of MGC 100 and to provide frequency regulation and synchronization with the microgrid 104. This is done as frequency deviations are commonplace in microgrid connection applications, and thus both sides need to be constantly monitored and synchronized, so that its performance is comparable to a B2B interface.

In the AC link, the first and the second impedances Z1 and Z2 are coupled to T1 and both AC lines of converters 110 and 112 as a current divider. This current divider sets the current of converter 112 to be larger than the current of converter 110. The current divider in the AC link forces the need to synchronize the frequencies between grid 102 and microgrid 104, as it establishes a synchronous connection between them. The B2B on the other hand is asynchronous. The current flow division between a high value Z1 branch and a low value Z2 branch around converter 110 allows for a reduction of its size and that of the DC link relative to a typical B2B interface because the transformer of converter 110 receives a much lower voltage relative to the voltage at T1 due to the high value Z1. More specifically, due to the series nature of MGC 100, the voltage ratings of the converter circuits in converters 110 and 112 and the DC link are approximately 10% to 20% of the line voltage, which roughly determines the converter ratings for a B2B interface. Due to the low value Z2, the transformer of converter 112 receives a voltage that is similar to the voltage at T1. The reduced ratings decrease the costs and physical size of MGC 100, thus potentially resulting in 80% to 90% savings compared to the B2B interface.

In an alternate embodiment, Z1 can be connected in series between T2 and converter 112 with a terminal of Z2 connected to T2. In such an alternate embodiment, converter 112 is configured to be responsible for regulating the DC link while converter 110 is configured to be responsible for regulating the frequency. Preferably, the source of the measured frequency, either T1 or T2, dictates which of converter converters 110 or 112 is responsible for regulating the frequency.

Figure 2B:
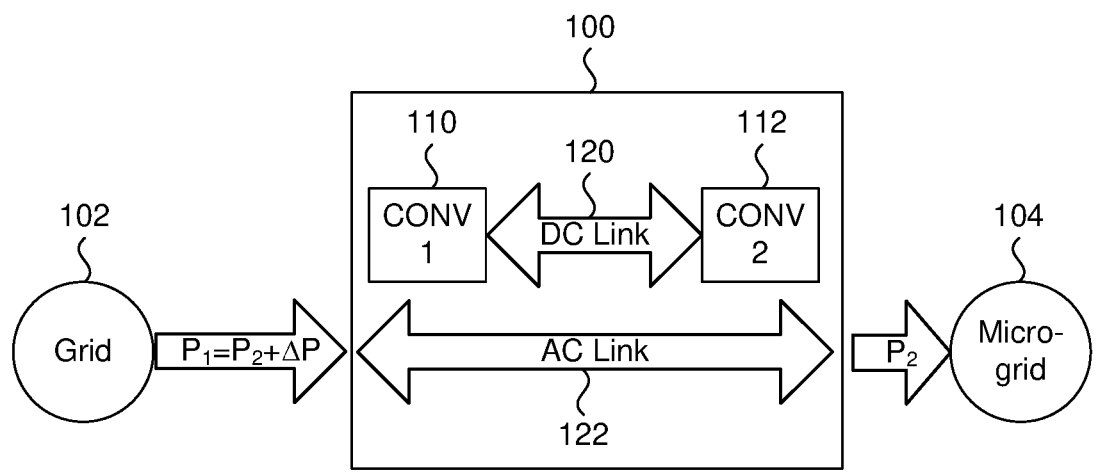
FIG. 2B is a diagram showing the active power flow from a grid to a microgrid using the MGC of FIG. 2A, according to a present embodiment.

The resulting active power flow between the grid and the microgrid through the MGC 100 is now shown in FIG. 2B. FIG. 2B shows a simplified representation of MGC 100 of FIG. 2A, with only converter 110 and converter 112. The DC link of FIG. 2A is shown by the bidirectional arrow element 120, while the AC link is shown by the bidirectional arrow element 122. The reactive power control is discussed later as part of the voltage regulation scheme.

Thus, a given $P_2$ value can be supplied from the main grid 102 through both AC link 122 and DC link 120, while a larger proportion of the power is provided through the AC link 122. Note that $P_2$ can be zero, implying a synchronous grid connection where the microgrid 104 is supplying its load. The losses $\Delta P$ incurred in the MGC 100 are supplied/supplemented from the main grid 102 to guarantee a stable and reliable DC voltage at the DC link 120, required for smooth operation of both converters 110 and 112. Hence the total power $P_1$ from grid 102 to MGC 100 is the sum of $P_2$ and $\Delta P$, so that power $P_2$ is provided to microgrid 104 via MGC 100.

Now that an overview of MGC 100 has been described, a description of the components of MGC 100 follows.

Figure 3:
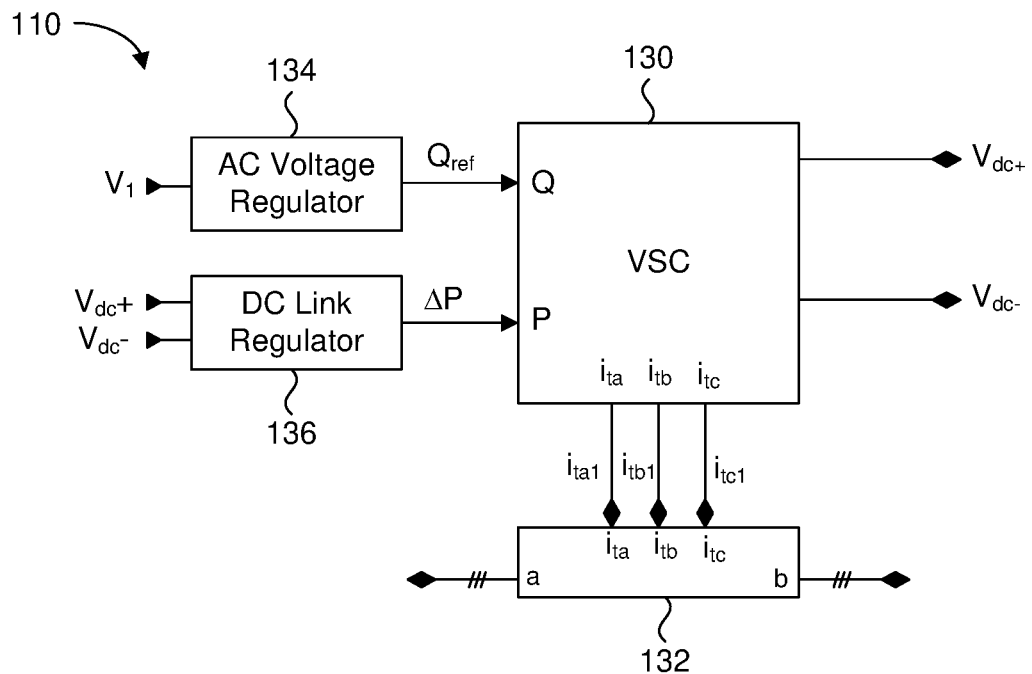
FIG. 3 is a block diagram of a first converter of the MGC, according to a present embodiment.

FIG. 3 is a block diagram of converter 110 of MGC 100, according to a present embodiment. Converter 110 includes a bidirectional-switch-based Voltage Source Converter (VSC) 130, a three-phase transformer 132, an AC voltage regulator 134, and a DC link regulator 136. VSC 130 is a well-known circuit, and can be designed with a variety of known circuit configurations. The minimum functional requirements for VSC 130 is the bidirectional conversion of AC to DC, and the ability to dynamically control current in response to control signals based on references and power flow setpoints predetermined by the operators of one or both the grid 102 and the microgrid 104. The power flow setpoints are based on the power desired at T2. Accordingly, VSC 130 has three-phase AC voltage lines $i_{ta1}$, $i_{tb1}$, and $i_{tc1}$ for connection to transformer 132, DC link lines $V_{dc+}$ and $V_{dc-}$, and receives reference signals $Q_{ref}$ and $P_{ref}$. $Q_{ref}$ is a reactive power reference while $P_{ref}$ is corrective DC link signal.

The AC voltage regulator 134 measures voltage $V_1$, and generates $Q_{ref}$ based on a comparison to a predetermined reference voltage which should be at T1. The DC link regulator 136 measures $V_{dc+}$ and $V_{dc-}$, and generates $\Delta P$ based on a comparison to a predetermined reference voltage desired for the DC link. The transformer 132 changes the AC voltage between terminals a and b to provide a converted voltage appearing on three-phase lines $i_{ta1}$, $i_{tb1}$, and $i_{tc1}$, and vice versa. As will be discussed later, it is because of the high value impedance of Z1 that the transformer 132 can be significantly reduced in size relative to a B2B implementation.

In the presently shown embodiment, converter 110 is responsible for regulating the DC link to maintain $V_{dc+}$ and $V_{dc-}$ at nominal levels. This is because converters 110 and 112 require a smooth and stable DC voltage to function properly, and it is closer to the grid 102. The DC link, in its basic form, is modeled as a DC capacitor connected in series with a resistive component to represent losses in the circuit. Its DC voltage fluctuates based on the instantaneous flow of energy in and out of the MGC 100, hence the inclusion of DC link regulator 136.

Figure 4:
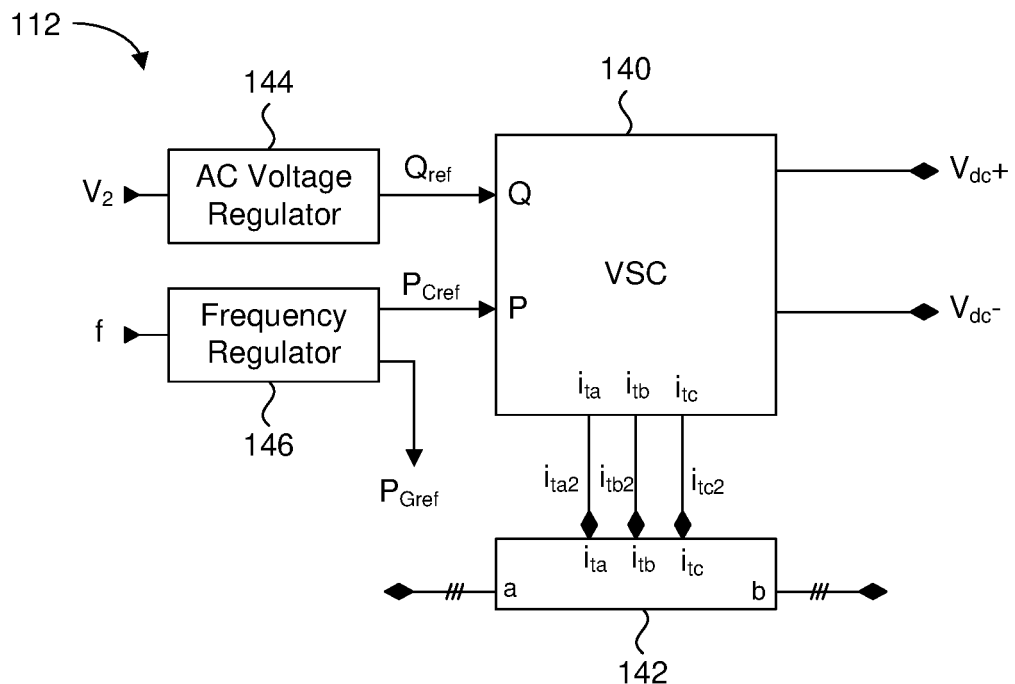
FIG. 4 is a block diagram of a second converter of the MGC, according to a present embodiment.

FIG. 4 is a block diagram of converter 112 of MGC 100, according to a present embodiment. Converter 112 includes a VSC 140, a three-phase transformer 142, an AC voltage regulator 144, and a frequency regulator 146. It is noted that several blocks are the same in FIG. 3 and FIG. 4. In the present embodiment, VSC 140 is configured the same as VSC 130, transformer 142 is configured the same as transformer 132, and AC voltage regulator 144 is configured the same as AC voltage regulator 134. Here AC voltage regulator 144 measures the voltage $V_2$ at terminal T2 in FIG. 2A. VSC 140 is connected to the same $V_{dc+}$ and $V_{dc-}$ lines and its three-phase AC voltage lines are labelled $i_{ta2}$, $i_{tb2}$, and $i_{tc2}$.

Converter 112 does not have the DC link regulator 136 of converter 110, and instead has the frequency regulator 146. The frequency regulator 146 receives as input a frequency of the microgrid 104 from terminal T2 and generates the active power reference $P_{Cref}$ for VSC 140 and local frequency reference for $P_{Gref}$ local generators connected to the microgrid 104. Further explanation for the purpose of frequency regulator 146 follows.

The MGC provides a synchronous connection to microgrid 104. However, due to the nature of microgrid 104 and intermittent resources, the frequency may deviate from the nominal value due to an imbalance between its local load and supply. Therefore, the frequency at grid 102 and microgrid 104 should be constantly monitored and, if needed, the active power reference $P_{Cref}$ and of the local generators $P_{Gref}$ are adjusted by the frequency regulator 136. In the present embodiment, converter 112 is closer to the microgrid 104, and is therefore responsible for frequency regulation based on the measured frequency of the microgrid 104 relative to a reference frequency desired for the microgrid 104.

Figure 5:
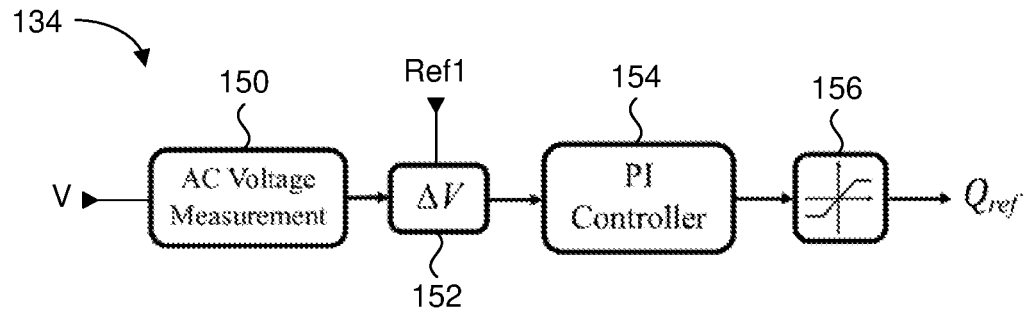
FIG. 5 is a block diagram of the AC voltage regulator shown in FIG. 3 or FIG. 4, according to a present embodiment.

FIG. 5 is a block diagram of the AC voltage regulator 134 or 144 shown in FIG. 3 and FIG. 4, according to a present embodiment. The AC voltage regulator 134 includes an AC voltage measurement circuit 150, a comparator circuit 152, a proportional integral (PI) controller 154 and a signal limiting circuit 156. PI controllers are well known in the art to be configurable with parameters of the context they are used within, and further details of its operation is unnecessary.

It is assumed that reference values are preset for active and reactive power flows at the device terminals T1 and T2. However, the voltage magnitude at a given controller terminal can equivalently be controlled instead of controlling the reactive power supplied/absorbed. In the present embodiment, the AC voltage regulator 134 is a control loop for regulating the voltage magnitude at the device terminal. The AC voltage measurement circuit 150 measures voltage and power at its V input ($V_1$ in FIG. 3; $V_2$ in FIG. 4), then the measured value is compared with the predetermined reference voltage Ref1 at comparator circuit 152 to generate an error signal. This error signal is passed through PI controller 154 to generate the required reactive power reference $Q_{ref}$. The signal limiting circuit 156 ensures that the $Q_{ref}$ level swings between min and max values suitable for the system.

The described voltage control approach for AC voltage regulator 134 uses a nested control structure. Thus, the closed loop bandwidth of the outer voltage control loop should be adequately lower than the inner current control loop. Moreover, coordination with local voltage regulators, if any, should be considered in the design.

Figure 6:
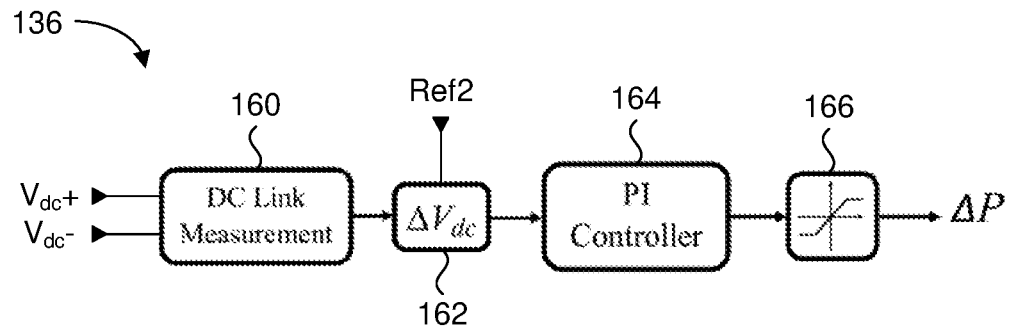
FIG. 6 is a block diagram of the DC Link regulator shown in FIG. 3, according to a present embodiment.

FIG. 6 is a block diagram of the DC link regulator 136 shown in FIG. 3, according to a present embodiment. The converters 110 and 112 require a smooth and stable DC voltage to function properly. The DC link regulator 136 of the present embodiment includes a DC link measurement circuit 160, a comparator circuit 162, a proportional integral (PI) controller 164 and a signal limiting circuit 166.

The DC link regulator 136 is a dedicated control loop used to regulate the DC link voltage level ($V_{dc+}$ and $V_{dc-}$). Configured the same as the previously described AC voltage regulator 134 of FIG. 5, the main differences being that the DC link voltage is measured and the deviation relative to a predetermined reference voltage Ref2, which is the desired DC link voltage level. The resulting signal $\Delta P$ is later used to correct DC link voltage to its intended values.

Figure 7:
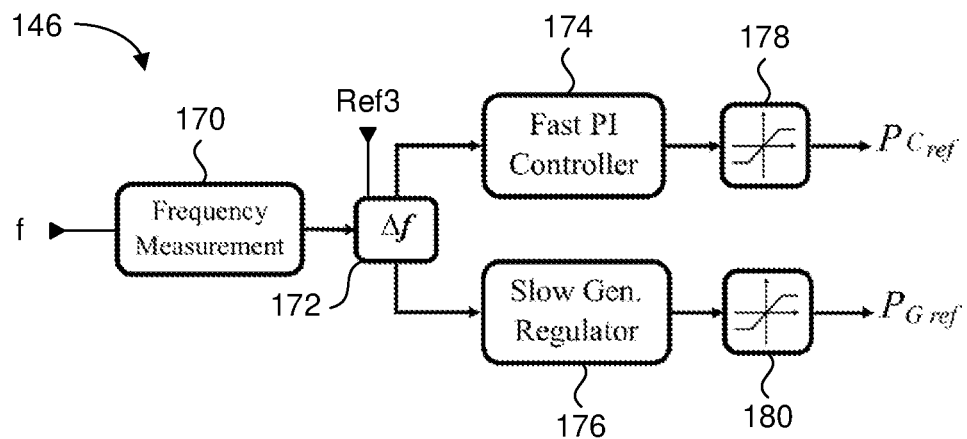
FIG. 7 is a block diagram of the frequency regulator shown in FIG. 4, according to a present embodiment.

FIG. 7 is a block diagram of the frequency regulator 146 shown in FIG. 4, according to a present embodiment. The frequency regulator 146 includes a frequency measurement circuit 170, a comparator circuit 172, a PI controller 174, a slow generator regulator 176 and signal limiting circuits 178 and 180. The PI controller 174 operates faster relative to slow generator regulator 176, or in other words, they both operate at different time scales. The frequency measurement circuit 170 receives as input frequency f from terminal T2, which is the frequency of microgrid 104, and measures its frequency. The comparator 172 compares the measured frequency with the predetermined reference frequency Ref3 that is intended for microgrid 104. The difference is provided to both PI controller 174 and the slow generator regulator 176. PI controller 174 then generates the active power reference $P_{Cref}$ and the local generators reference $P_{Gref}$. The reason two references are generated in this manner is now explained.

The local frequency regulators of generators connected to microgrid 104 are slower than the PI controller 174 in the frequency control loop of MGC 100. Thus, in the case of any frequency deviations in the microgrid 104, the MGC 104 first responds quickly via a frequency regulator 146, and in particular PI controller 174, and balances the supply-demand from the main grid. The frequency regulators on the local generators receive $P_{Gref}$ which is distributed via terminal T2, and thus react to it. Therefore, after a delay, the local generators on the microgrid respond and relax the interface frequency control requirements, with the nominal frequency being supported by the local generators.

The described control approach uses a nested control structure in the MGC 100. Thus, the closed loop bandwidth of the outer frequency control loop should be adequately lower than the inner current control loop of the MGC 100, and higher than that of local generators. In other words, the PI-controller 174 parameters are chosen so that the time constant of the frequency control loop is considerably larger, such as at least 10 times larger, than the current-control loop time, while being faster than the local DER controls.

Figure 8:
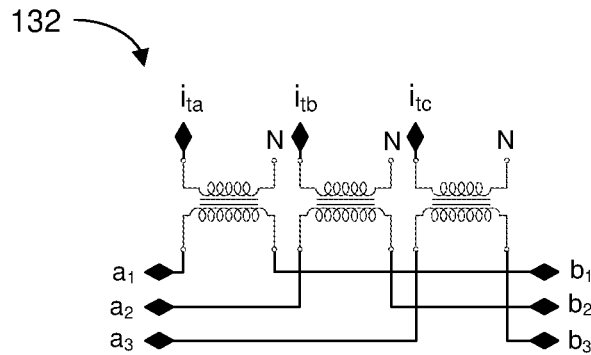
FIG. 8 is circuit schematic of the transformer used in the converters of FIG. 3 and FIG. 4.

FIG. 8 is circuit schematic of the transformer 132 used in converter 110 of FIG. 3 and transformer 142 used in converter 112 of FIG. 4. Power terminals a and b in FIGS. 3 and 4 are shown in more detail as separate three-phase lines $a_1$, $a_2$, $a_3$ and $b_1$, $b_2$, $b_3$. Here the primary coils are connected to $i_{ta2}$, $i_{tb2}$, and $i_{tc2}$ in FIG. 3 or to $i_{ta2}$, $i_{tb2}$, and $i_{tc2}$ in FIG. 4, while the secondary coils are connected in series between terminal pairings of $a_1$ with $b_1$, $a_2$ with $b_2$, and $a_3$ with $b_3$. These pairings are collectively referred to as the previously mentioned AC line in each of converters 110 and 112. Accordingly, converters 110 and 112 of FIG. 2A are serially connected by way of the series connection of their respective AC lines with each other, where each of $b_1$, $b_2$, $b_3$ of converter 110 are coupled to $a_1$, $a_2$, $a_3$ of converter 112.

The turn ratios for the primary and secondary coils can be selected to have any predetermined ratio to suit the design of the particular MGC for a specific power grid system it is being used with. By example, the turn ratio can be 1:1 to provide isolation. Furthermore, the transformer 132 used in converter 110 can have different turn ratios than transformer 142 used in converter 112. In the current embodiment the turn ratios for both transformers are the same.

Figure 9:
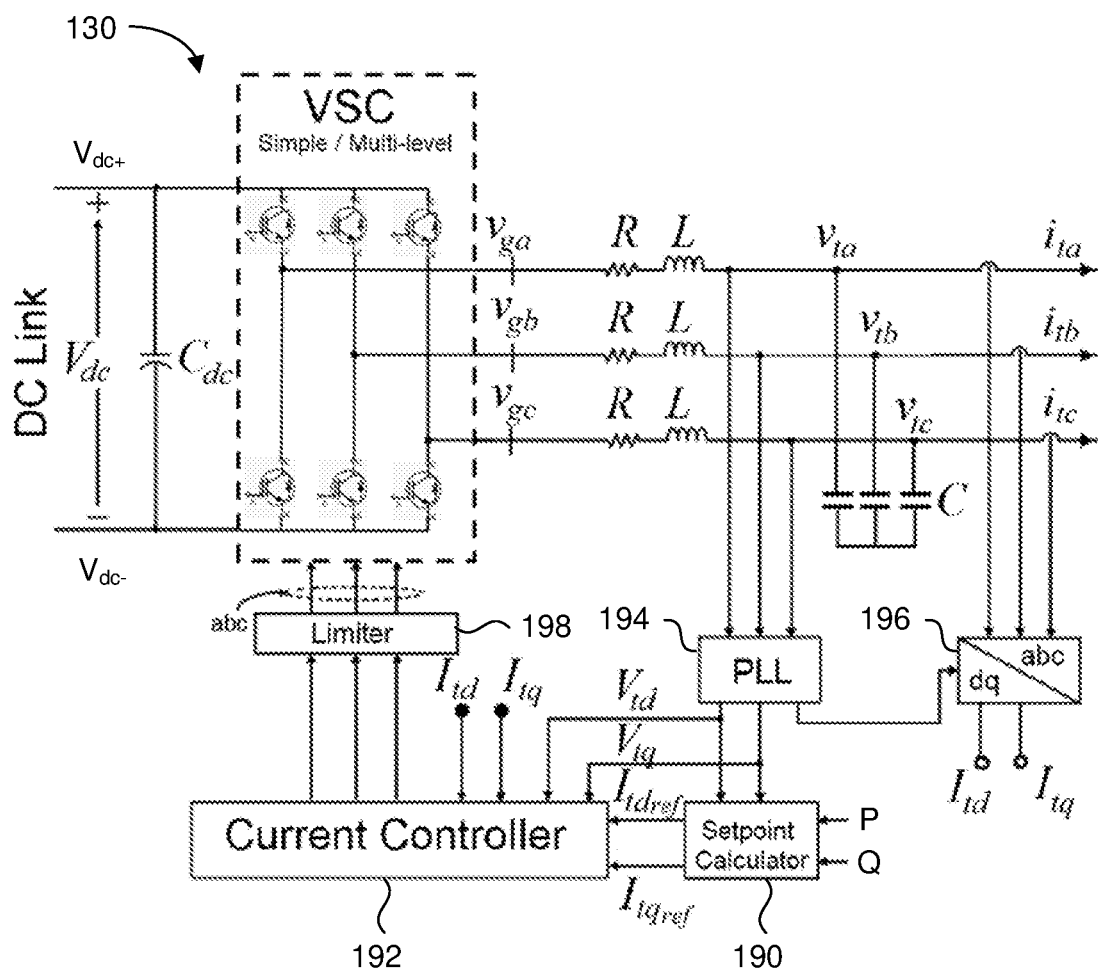
FIG. 9 is a circuit schematic of a bidirectional switch based voltage source converter (VSC) shown in FIG. 3 and FIG. 4, according to a present embodiment.

FIG. 9 is a circuit schematic of a bidirectional switch based voltage source converter (VSC) shown in FIG. 3 and FIG. 4, according to a present embodiment. This example VSC shown in FIG. 5 includes filters, required passive elements, and other functional blocks that are well known in the art, with the transformer and switch commutation inductance being lumped with the harmonic filter impedance. Although the main purpose of the filter is to remove harmonic content, it affects the fundamental frequency component as well, and thus its impact on the output voltage and current should be considered. It should be noted that the specific circuit configuration of VSC 130 shown in FIG. 5 is well known in the art. Accordingly, a detailed description of the all the components and their functions is not needed. In alternate embodiments, multi-level and other advanced forms of VSCs may also be used in MGC 100.

In the presently shown configuration of VSC 130, the specific functional blocks which can change the operating parameters of the circuit in response to signals generated by the AC voltage regulators 134 and 144, the DC link regulator 136, and the frequency regulator 146 are now described in further detail. A setpoint calculator 190 is provided to generate a current reference for current controller 192, in response to the aforementioned measurements and power flow setpoints provided by the operator. The setpoint calculator 190 has inputs P and Q which can receive either $Q_{ref}$ and $P_{ref}$ from the configuration shown in FIG. 3 or $Q_{ref}$ and $P_{Cref}$ from the configuration shown in FIG. 4. The setpoint calculator 190 further receives voltages $V_{td}$ and $V_{tq}$ from the phase locked loop (PLL) 194, and provides setpoint current signals $I_{tdref}$ and $I_{tqref}$. More specifically, the setpoint calculator 190 is part of a feedback loop with PLL 194 to change $I_{tdref}$ and $I_{tqref}$ as the measured parameters from the previously described regulators change from their respective nominal reference values. The PLL 194 is a well-known circuit block that provides the phase angle of the voltage plus one of its dq components at a certain location.

The current controller 192 receives as input $I_{tdref}$ and $I_{tqref}$ as well as $V_{td}$ and $V_{tq}$ from PLL 194, and additional currents $I_{td}$ and $I_{tq}$ provided by transformation circuit 196, and is responsible for generating the signals that control the driver transistors of $i_{ta}$, $i_{tb}$ and $i_{tc}$ connected between $V_{dc+}$ and $V_{dc-}$. The transformation circuit 196 is configured to execute the well-known abc to dq transformation mathematical concept. The limiter 198 is provided to remove any unreasonably large values or spikes from the output signals of current controller 192. Accordingly, current controller 192 controls the electrical parameters of the VSC driver transistors in response to one or more of the measured AC voltage, DC link voltage and frequency.

In the present embodiment, the current controller 192 is realized using PI current controllers in the dq-reference frame. This scheme allows independent active and reactive power regulation. The switching frequency $\omega_s$ is significantly larger than R/L if the filter parameters are chosen properly, and thus the high-frequency components of the input do not significantly affect the output, resulting in small ripples.

Under this assumption, the relationship between the input and output voltages and currents in the dq-reference frame can be expressed as follows in equations 1 and 2:

$$V_{gd} = V_{td} + \omega L I_{tq} + RI_{td} - \omega^2 LCV_{td} + RC\omega V_{tq} \quad \text{Equation 1}$$

$$V_{gq} = V_{tq} - \omega L I_{td} + RI_{tq} - \omega^2 LCV_{tq} - RC\omega V_{td} \quad \text{Equation 2}$$

These equations can be considered as an open-loop system with the currents $I_{td}$, $I_{tq}$ as the output, and voltages $V_{gd}$, $V_{gq}$ as the input. Voltages $V_{gd}$ and $V_{gq}$ are the result of matrix multiplication of $V_{ga}$, $V_{gb}$ and $V_{gc}$ shown in FIG. 9. The control objective is to regulate $I_{td}$ and $I_{tq}$, which can be achieved with the closed-loop system shown later in FIG. 11.

Figure 10:
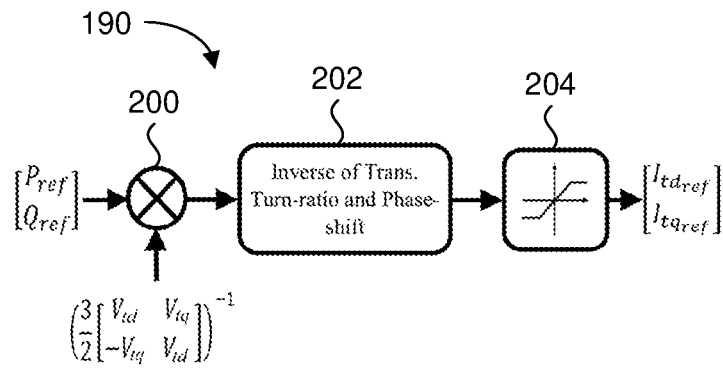
FIG. 10 is a block diagram of the current setpoint calculator shown in FIG. 9, according to a present embodiment.

FIG. 10 is a block diagram of the current setpoint calculator 190 shown in FIG. 9, according to a present embodiment. The current setpoint calculator 190 includes a summation block 200, and inverse transformer block 202, and a signal limiting circuit 204. The summation block 200 receives P and Q and adds to the active power reference point an auxiliary signal to account for internal losses and the DC link voltage regulation. In the present embodiment this auxiliary signal is provided by the output of DC link regulator 136 of FIG. 6. The inverse transformer block 202 operates on the resulting signal from the summation block 202 to generate the setpoint current signals $I_{tdref}$ and $I_{tqref}$ which are limited to min and max values by signal limiting circuit 204. More specifically, the inverse transformer block 202 is a circuit configured to execute a mathematical operation that accounts for the inverse of the turn ratio and any phase shift of the transformer coupled to VSC 130 or VSC 140.

Figure 11:
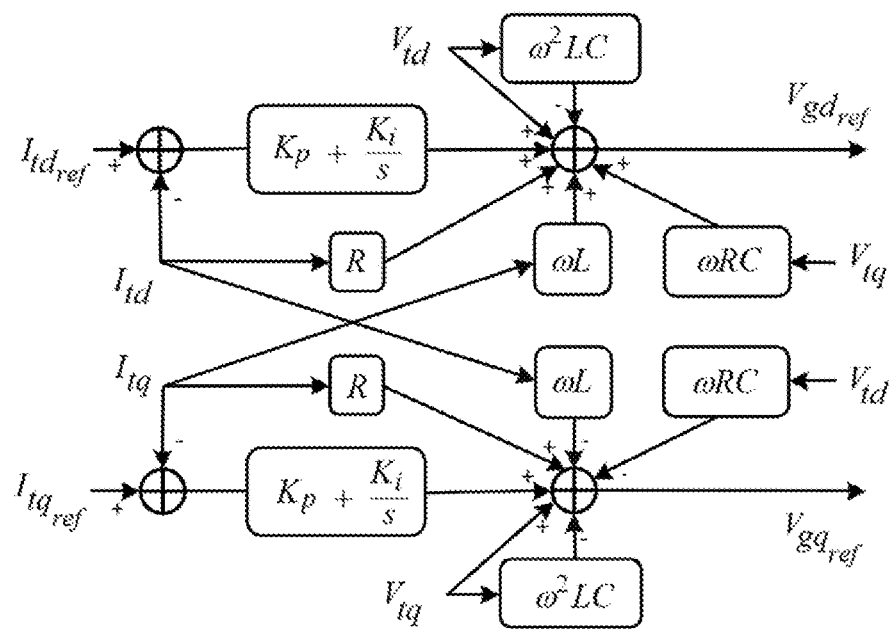
FIG. 11 is a design diagram for the current controller shown in FIG. 9, according to a present embodiment.

FIG. 11 is a design diagram for the current controller shown in FIG. 9, according to a present embodiment. FIG. 11 shows a mathematical closed-loop system in which the reference current value is compared with the measured current value, and the error signal is processed by a PI controller to generate the desired outputs $V_{gd}$ and $V_{gq}$. The outputs of the PI controller and the control loop are properly limited. It should be noted that blocks with the Kp+Ki/s are implemented as PI controllers in the present embodiment, but the design diagram of FIG. 11 can be implemented with any suitable circuit configuration.

The parameters $K_p$ and $K_i$ of the PI controllers can be chosen to cancel the pole created due to the presence of L at the output of the converter. Therefore, the equivalent control path from the current reference to the output value becomes a first-order lag with a time constant σ. Thus, based on the values of the circuit elements R and L, and the design parameter σ, the gains can be expressed as follows in equations 3 and 4:

$$K_p = \frac{L}{\tau} \quad \text{Equation 3}$$

$$K_i = \frac{R}{\tau} \quad \text{Equation 4}$$

The time constant σ should be small to provide a fast current-control response, yet large enough so that 1/σ is considerably smaller than the switching frequency $\omega_s$. The latter constraint results in the output following the fundamental-frequency component of the reference signal by neglecting high order harmonics.

Figure 12:
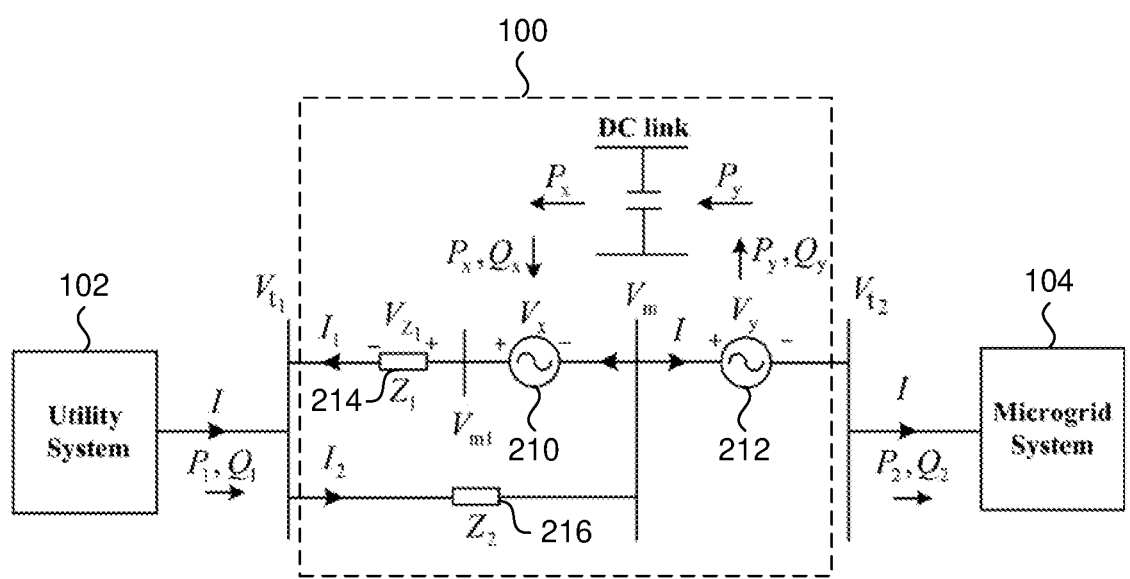
FIG. 12 is an equivalent circuit of the MGC shown in FIG. 2A, according to a present embodiment.

Now that the main components of MCG 100 has been described, following is a power flow analysis of MCG 100 with reference to its equivalent circuit shown in FIG. 12.

FIG. 12 is an equivalent circuit of the MGC 100 shown in FIG. 2A, according to a present embodiment. Two series voltage sources 210 and 212 represent the two VSCs 130 and 140 respectively of MGC 100. The high-value resistance of impedance 214 (Z1) and low-value resistance of impedance 216 (Z2) for converter 110 provide power division. $V_{t1}$ is the voltage at connection terminal T1 of the grid 102, while $V_{t2}$ is the voltage at the connection terminal T2 of the microgrid 104. $P_1$, $Q_1$, and $P_2$, $Q_2$ are the power flowing in and out of MGC 100. $P_x$ and $Q_x$ are the active and reactive power flowing out of VSC 130 from the DC link, and $P_y$ and $Q_y$ are the power injecting into converter 112.

Since the value of Z2 is small, $V_{t1}$ is nearly equal to $V_m$. Thus, $V_x$ is basically $V_{Z1}$, and the power of Z1 is mainly covered by the active power flowing out of converter 110. Considering the power loss of the converters, the power balances of the MGC 100 can be expressed as equations 5 and 6:

$$P_y = \Delta P + P_x \quad \text{Equation 5}$$

$$P_x = P_{Z1} \quad \text{Equation 6}$$

Based on these power flows, it can be concluded that $P_y > \Delta P$. Hence, the setpoints of the MGC 100 can be selected based on the power flow calculations to guarantee proper operation.

Therefore, due to the series nature of the MGC 100, namely the series interconnections of the AC link between terminals T1 and T2, the voltage ratings of the converters 110 and 112 and of the DC link are approximately 10% to 20% of the line voltage, which roughly determines the converter ratings for a B2B. The reduced ratings contributes directly to a decrease in the costs and physical size of MGC 100 relative to traditional B2B, thus potentially resulting in 80% to 90% savings compared to the traditional B2B.

Not only does the MCG 100 of the present embodiments provide significant cost improvements over traditional B2B, simulations using real values shows how MCG 100 further provides at least the same performance as traditional B2B. From this point forward, the MCG mentioned in the simulation discussion refers to the MCG 100 according to the present embodiments.

The following simulation cases are described to illustrate the performance improvements over traditional B2B.

Case 1: Grid-microgrid connection and changes in the interface power setpoints.

Case 2: Gradual load changes of the microgrid.

Case 3: Three-phase fault conditions at the end of a microgrid feeder.

Case 4: Abrupt power changes due to a sudden loss of local generation in the microgrid.

Figure 13:
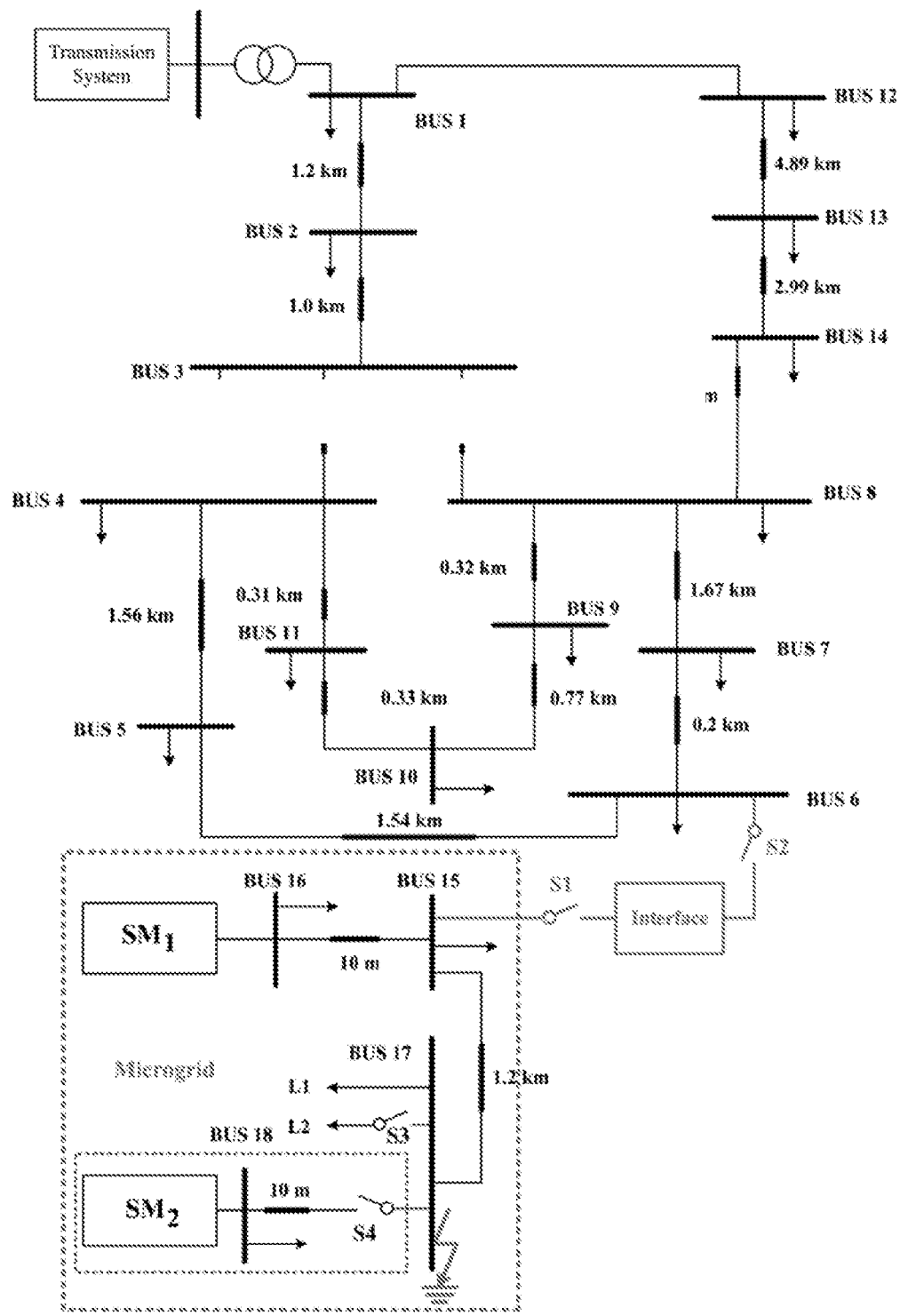
FIG. 13 shows an example test system of a grid and a microgrid connected to the MGC of the present embodiment, or to a B2B.

The studies were conducted based on detailed time-domain simulations in PSCAD™, using the test system shown in FIG. 13. FIG. 14 shows a table listing DER parameters for the simulations. FIG. 15 shows a table listing microgrid load parameters for the simulations. FIG. 16 shows a table listing B2B converter/controller parameters for the simulations. FIG. 17 shows MGC 100 converter/controller parameters for the simulations.

For the simulations, the test system as shown in FIG. 13 was set up as a 12.47 kV and 60 Hz ADN based on the North American CIGRE distribution system, and comprises two main parts, namely, the main distribution system such as grid 102 and a microgrid such as microgrid 104 connected via MGC 100 or B2B interfaces. Accordingly, references to "interface" or "interfaces" means either the MGC of the present embodiment or traditional B2B.

The main distribution system includes three switches to introduce loops and allow to test various DERs and new controllers under different configurations, in the context of smart grids. The total load of the main system is about 3 MW, distributed among the buses connected via feeders modeled as coupled-pi sections.

The microgrid is assumed to represent an industrial site or a residential complex. It includes two diesel generators as DERs, 4 nodes, and 5 impedance loads. The generators and governors are modeled using PSCAD's models, which represent the generator as a voltage source behind an $R_s+jX_s$ impedance modeled with classical mechanical speed dynamics, and a governor for frequency regulation modeled with a first order transfer function with droop, which suffices for the purpose of the simulations and tests presented here. The microgrid accommodates a total of about 2 MVA local demand, with the main parameters presented in Tables I to IV shown in FIGS. 13-16.

Switches S1 and S2 can connect or disconnect the MGC/B2B interface between the microgrid and the main distribution system, with the B2B being modeled similarly as the MGC DC interface VSCs and controls. Switches S3 and S4 are used for the case studies regarding load and generation changes in the microgrid, but in the other cases, these are assumed to be open.

Simulation Case 1

The microgrid should be able to transition from grid connected to isolated and vice versa without significant undesirable transients. Moreover, the transferred power between the two systems needs to be controlled precisely and flexibly based on the operators' dispatch signals. Therefore, the grid-microgrid connection, and changes of power setpoints are analyzed in this section. The two systems operate separately in steady state before closing switches to a couple the interface to both grids at 30 s. The setpoints of the active and reactive power injected into the microgrid are 0 MW and 0.8 Mvar (this is, approximately, the minimum reactive power needed for MGC stability). The DC-voltage level references for the MGC and B2B are 7 kV and 24 kV, respectively. To demonstrate the power control capabilities of the interfaces, the active power setpoint changes from 0 MW to 0:1 MW at 80 s.

The simulation results of the connection are shown in FIGS. 18 to 21.

Note that the DC voltages shown in FIG. 18 are maintained at their desired values. FIG. 19 shows the microgrid frequency and the voltage of the microgrid connection terminal. Observe that the MGC of the present embodiment offers a better frequency response with smaller deviations due to its additional frequency controller. FIGS. 20 and 21 show the power of the microgrid interface and local generator, showing that the active and reactive power injected into the microgrid is controlled at the command values 0 MW and 0.8 Mvar, respectively.

The simulation results of the power setpoint change at 80 s are shown in FIGS. 22 and 23, where the MGC shows a better frequency response due to the cooperation of the frequency regulators in converter 112 and the local generator. However, the active and reactive power needs a longer time to settle for the same reason.

Simulation Case 2

Load Fluctuations or changes in the microgrid are expected in practice. Thus, the microgrid interface coordinated with the local generator should be able to mitigate the impact of such events on the microgrid frequency and loads. To simulate these operating conditions, Switch S3 is closed at 80 s, and the load gradually increases from 0 to 60 kW and 30 kvar at a rate of 3 kW and 1:5 kvar every 2 s, respectively. The setpoints of DC-voltage, and active and reactive powers are identical to those of the previous study before 80 s.

FIGS. 24 to 26 illustrate the simulation results for this case. Note that the AC voltages in the two types of interfaces experience a slight fluctuation. Compared with the B2B, the MGC covers first the power changes of the microgrid with its additional frequency controller, with the local generator then reacting to the frequency deviations slowly, thus relaxing the power requirements from the MGC. The load increase is eventually supplied by the local generator, and the power of the interface returns to its initial value. In this case, the MGC based system shows a smaller frequency deviation than with the B2B, more significant active power fluctuations, and longer time for the active power to regain its initial value.

Simulation Case 3

The performance of the interface controllers under fault conditions is studied here; thus, a three-phase resistive fault at Bus 17 at the end of the microgrid feeder is simulated in this case. The fault occurs at 80 s and clears after 3 cycles (50 ms). The setpoints of the MCG and B2B interfaces are identical to those of the previous study before 80 s. In this case, the interface controllers respond to the event, as shown FIGS. 27 and 28. Observe that both controllers perform similarly, with the MGC showing better response due to its frequency and voltage control capabilities, which are required for the interface to properly operate with a synchronous connection.

Simulation Case 4

An abrupt loss of local generation capacity is considered here, which directly impacts the system frequency and loads. To simulate this loss, Switch S4 is assumed to be closed at the start, thus connecting the second synchronous machine to the system, and the setpoints for the interfaces are assumed identical to the previous case before 80 s. The switch S4 then opens at 80 s, abruptly reducing the local generation by 110 kW. As shown in FIGS. 29 to 31, the microgrid interface controllers respond immediately, compensating the lost generator from the main grid, to give time to the other generator to bring the frequency back to its nominal value. Note that with both controllers the frequency recovers quickly to its nominal value, but the MGC performs better due to better coordination with the DER and faster controls.

Now that the performance of the MCG 100 according to present embodiment is at least the same or superior to the traditional B2B, it is also a more cost-effective solution, which is now explained in the context of the simulated system above.

The voltage ratings of the two VSCs and the DC link in the MGC and B2B are compared here to analyze minimum hardware requirements that could directly affect the installation costs and logistics. The setpoints for active and reactive power are assumed to be 0 MW and 0.8 MVAR, respectively. Note that the DC voltage levels of the DC links for the MGC and B2B are significantly different, i.e., 7 kV and 24 kV, respectively. The voltage levels for the MGC on the secondary side of the transformers (1.02 kV and 2.75 kV) are much lower than those for the B2B (11.95 kV and 12.48 kV), whereas that the current ratings of MGC and B2B are identical. In the present embodiment, the AC lines of the MGC would have such voltage levels. Thus, the ratio of their ratings are approximately the ratio of their converter voltage ratings, which in this case is about 20%. A similar conclusion can be made for the capacitor DC voltage. Therefore, for a given $/kVA price for the converters, the MGC's smaller ratings would result in reduced hardware costs by about 80%.

The final installation costs including construction costs of the buildings housing the equipment are roughly double of the hardware costs, which again results in reduced costs because of the MGC, given its smaller size and footprint. Finally, the smaller size and voltage ratings of the MGC simplify the installation and operational logistics including component delivery etc. resulting again in further cost reduction.

The lower operating voltages of the MGC of the current embodiment relative to B2B also has the advantage of being safer to people who need to install and maintain the MGC. The chances of death to a person during inadvertent contact with the MGC operating voltages is decreased relative to B2B operating voltages.

The MGC interface according to the present embodiments provides two paths for power flow between its terminals, namely, AC and DC links. It also offers frequency control in addition to voltage/flow control, as frequency deviations are commonplace in microgrid connection applications. The disclosed MGC architecture of the present embodiments allows for a reduction in the converter size of the interface and of the DC link, resulting in voltage ratings of a fraction of the system line voltage, while providing performance at least the same as a typical B2B controller interface.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A microgrid connector controller for coupling a first terminal of a first AC power grid to a second terminal of a second AC power grid, comprising:
   a first bidirectional AC/DC converter coupled to a DC link and having a first AC line;
   a second bidirectional AC/DC converter coupled to the DC link, having a second AC line coupled in series with the first AC line, and configured to regulate frequency of AC voltage of the second AC line to a predetermined frequency;
   an AC link configured to transfer active power from the first power grid to the second power grid including
      the first and second AC lines coupled in series with the second terminal, and
      a current divider coupled to the first terminal, the first AC line and the second AC line, for setting a current of the second bidirectional AC/DC converter to be larger than a current of the first bidirectional AC/DC converter.

2. The microgrid connector controller of claim 1, wherein the current divider includes
   a first impedance coupled in series between the first AC line and the first terminal, and
   a second impedance coupled in parallel with first impedance and the first AC line.

3. The microgrid connector controller of claim 2, wherein the resistance of the first impedance is greater than the second impedance.

4. The microgrid connector controller of claim 1, wherein the first bidirectional AC/DC converter is configured to drive a DC voltage on the DC link in response to the first AC voltage level of the first AC line.

5. The microgrid connector controller of claim 4, wherein
   the first bidirectional AC/DC converter includes a first 3-phase transformer with a secondary winding being the first AC line, and
   the second bidirectional AC/DC converter includes a second 3-phase transformer with a secondary winding being the second AC line.

6. The microgrid connector controller of claim 5, wherein the first bidirectional AC/DC converter includes a voltage source converter (VSC) coupled to a primary winding of the first 3-phase transformer and coupled to the DC link, the VSC configured to be responsive to a reactive power reference and an active power reference.

7. The microgrid connector controller of claim 6, wherein the first bidirectional AC/DC converter includes
   an AC voltage regulator configured to generate the reactive power reference in response to measured voltage at the first terminal compared to a first predetermined reference, and
   a DC voltage regulator configured to generate the active power reference in response to measured DC link voltage compared to a second predetermined reference, the reactive power reference and the active voltage reference being used by the VSC to drive and regulate the DC link voltage.

8. The microgrid connector controller of claim 5, wherein the second bidirectional AC/DC converter includes a voltage source converter (VSC) coupled to a primary winding of second first 3-phase transformer and coupled to the DC link, the VSC configured to be responsive to a reactive power reference and an active power reference.

9. The microgrid connector controller of claim 8, wherein the second bidirectional AC/DC converter includes
- an AC voltage regulator configured to generate the reactive power reference in response to measured voltage at the second terminal compared to a first predetermined reference, and
- a frequency regulator configured to generate the active power reference in response to measured frequency at the second terminal compared to a second predetermined reference, the reactive power reference and the active power reference being used by the VSC to regulate frequency of the AC voltage of the second AC line.

10. The microgrid connector controller of claim 9, wherein the frequency regulator includes
- a frequency measurement circuit configured to generate the measured frequency at the second terminal,
- a comparator circuit configured to generate a differential signal between the measured frequency and the second predetermined reference,
- a first proportional integral (PI) controller configured to generate the active power reference in response to the differential signal, and
- a second PI controller configured to generate a local power reference for local frequency regulators of generators connected to the second AC power grid.

11. The microgrid connector controller of claim 9, wherein the VSC includes
- a setpoint calculator configured to generate setpoint reference currents in response to at least the reactive power reference and the active power reference, and
- a current controller configured to generate control voltages for controlling driver transistors of the VSC in response to at least the setpoint reference currents.

12. The microgrid connector controller of claim 11, wherein the setpoint calculator includes
- a summation block configured to add an auxiliary signal accounting for internal losses to the reactive power reference and the active power reference,
- an inverse transformer block configured to execute a mathematical operation accounting for an inverse of the second 3-phase transformer turn ratio and phase shift to generate the setpoint reference currents.

* * * * *